US006644923B1

United States Patent
Fine et al.

(10) Patent No.: US 6,644,923 B1
(45) Date of Patent: Nov. 11, 2003

(54) FAN FOR AN ALTERNATOR

(75) Inventors: Joshua E. Fine, Oakton, VA (US); Jeffrey Allan Digby, Bowling Green, OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 248 days.

(21) Appl. No.: 09/670,778

(22) Filed: Sep. 27, 2000

(51) Int. Cl.$^7$ ............................................. F04D 29/24
(52) U.S. Cl. ............... 416/183; 416/213 R; 416/213 A; 416/235
(58) Field of Search ................................ 416/181, 183, 416/213 R, 213 A, 235

(56) References Cited

U.S. PATENT DOCUMENTS

| | | | | |
|---|---|---|---|---|
| 2,831,630 A | * | 4/1958 | Perry | ......................... 416/175 |
| 4,488,070 A | | 12/1984 | Iwaki et al. | |
| 5,241,230 A | | 8/1993 | Tanaka et al. | |
| 5,707,209 A | * | 1/1998 | Iyer et al. | ................ 416/186 R |
| 5,763,968 A | * | 6/1998 | Hayashi et al. | ................ 310/51 |
| 6,023,112 A | | 2/2000 | Asao | |
| 6,220,819 B1 | * | 4/2001 | Chien et al. | ............ 416/186 R |

FOREIGN PATENT DOCUMENTS

| | | |
|---|---|---|
| DE | 2952503 A1 | 7/1980 |
| FR | 2498391 | 7/1982 |
| GB | 2 192 432 A * | 1/1988 |

* cited by examiner

Primary Examiner—Ninh H. Nguyen
(74) Attorney, Agent, or Firm—John E. Kajander

(57) ABSTRACT

An electrical machine such as an alternator (10) has a first fan (12) and second fan (14) rotatably disposed within a first housing portion (16) and a second housing portion (18). The fans (12, 14) each comprise a continuous ring (54), a plurality of blades (56), and a plurality of tabs (58). The continuous ring (54) is disposed in a top plane and connects the plurality of blades (56) extending therefrom. The plurality of tabs (58) extends from the plurality of blades (56) into a bottom plane so as to be parallel to the continuous ring (54) disposed in the top plane.

7 Claims, 3 Drawing Sheets

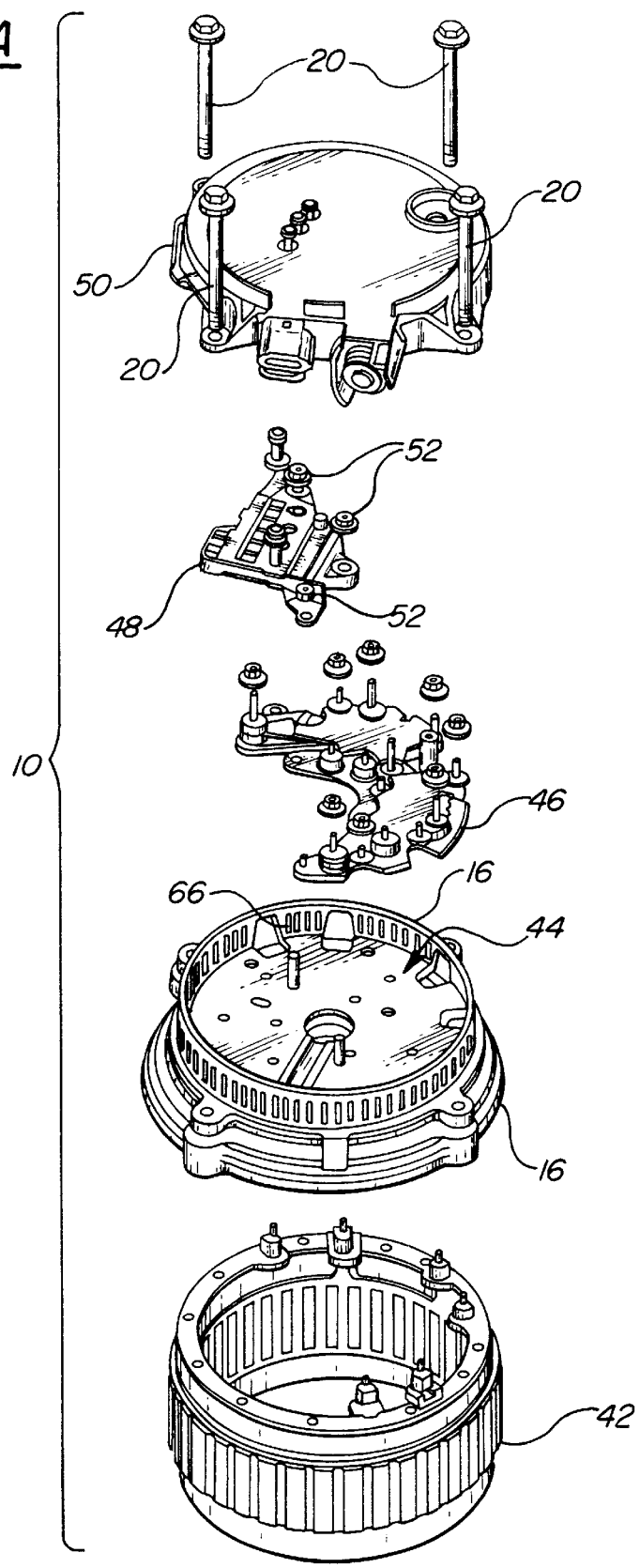

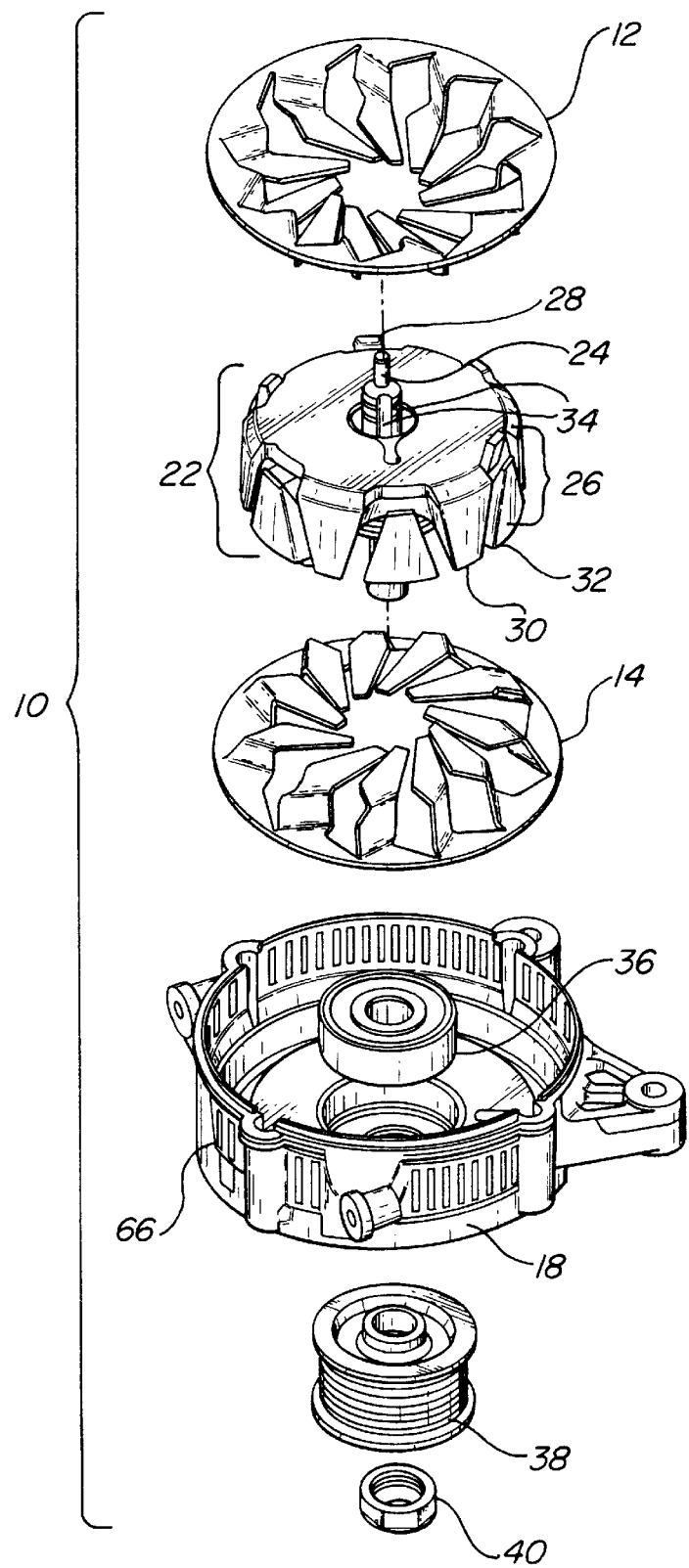

FAN FOR AN ALTERNATOR

TECHNICAL FIELD

The present invention relates generally to rotating electrical machines and, more particularly, to a fan for a rotating electrical machine.

BACKGROUND

The increasing demand for electrical power in automotive vehicles has driven advances in alternators (generators) for electrical power. As the components of electrical machines are heated, the electrical machines lose efficiency. Electrical machines commonly use fans in order to cool the machines and improve performance. These fans typically have blades supported at the base of the blades. Unfortunately, recently developed electrical machines require increasingly higher cooling rates such that the resulting increase in fan speed subjects the blades to centrifugal forces that commonly cause the blades to fracture. Since the tips of the blades are left unsupported, the centrifugal forces associated with the high speed rotation may fatigue the blades to the point of fracture by repeatedly bending the blades back and forth about their bases.

Currently, a typical alternator uses two fans, each comprising a round disk having an outer edge with rectangular blades extending perpendicularly therefrom. Ordinarily, the blades are only supported at their bases. These blades are disposed at a predetermined angle relative to a radial line of the disk. A bottom surface of the disk is fixedly coupled to a top surface of a rotor. A top surface of the disk is exposed to freely circulating air. The disk typically has a center opening with a rotatable shaft fixedly coupled thereto. The shaft has a longitudinal axis about which the fan rotates.

In operation, the fan typically draws air in a first direction parallel to the longitudinal axis of the shaft. The air flows from a space above the top surface of the disk into a center area of the fan. More specifically, air flows from an external space of the alternator through vent openings of the housing into the center area of the fan. Once inside the housing, the air cools the alternator. Then, the heated air is drawn in a second direction radially outward relative to the disk. The heated air typically flows from the center area of the fan across the top surface of the disk to the blades. Once the heated air reaches the blades, the blades may direct the heated air to flow along two general paths. On a first path, the blades direct the heated air in a third direction radially outward relative to the disk. The heated air may flow across an outer surface of the blades in a substantially radial direction with respect to the disk and exit the alternator through vent openings in the housing. Alternatively, on a second path, the blades may direct the heated air in a third direction parallel to the longitudinal axis of the shaft. The heated air flows across the outer surface of the blades away from the top surface of the disk. The heated air flows into the space above the top surface of the disk.

One disadvantage of the fan is that heated air which flows along the second path may fail to properly exit the alternator. The second path can direct the heated air into the space above the top surface of the disk. Because of the fluid nature of air, the heated air may be recirculated into the alternator as the fan draws air from the space above the top surface of the disk in the first direction. Another disadvantage of the fan is the fatigue fracture of blades resulting from the centrifugal forces associated with high rotational speed.

Known designs for preventing blade fracture include conventional fans using large gussets, thicker material, higher strength metal, or plastic material. However, the disadvantages of these fans can include limited success, higher costs, and manufacturing and packaging difficulty.

It would therefore be desirable to provide a fan for an electrical machine that can operate under high centrifugal forces without fatigue fracture and improve the cooling of the alternator to increase performance.

SUMMARY OF THE INVENTION

It is therefore one object to provide a fan for an electrical machine that provides increased support for each blade to prevent fracture thereof.

It is a further object of the present invention to provide a fan for an electrical machine that improves cooling by improving air circulation about the electrical machine.

In one aspect of the invention, a fan comprises a continuous ring, a plurality of blades, and a plurality of tabs. The continuous ring is disposed in a top plane and connects the plurality of blades extending therefrom. The plurality of tabs extends from the plurality of blades into a bottom plane so as to be parallel to the continuous ring disposed in the top plane. The plurality of tabs is preferably laser welded to a pole of the rotor.

One advantage of the invention is that the continuous ring and the plurality of tabs support the plurality of blades so as to allow the fan to operate at high rotational speeds without experiencing fatigue fracture. Another advantage is that the continuous ring directs the flow of heated air so as to improve circulation about the electrical machine and performance of the machine.

Other objects and features of the present invention will become apparent when viewed in light of the detailed description of the preferred embodiment when taken in conjunction with the attached drawings and appended claims.

BRIEF DESCRIPTION OF THE DRAWINGS

FIGS. 1A and 1B are an exploded view of an alternator having a fan according to the present invention.

DESCRIPTION OF THE PREFERRED EMBODIMENT

Figure 2:
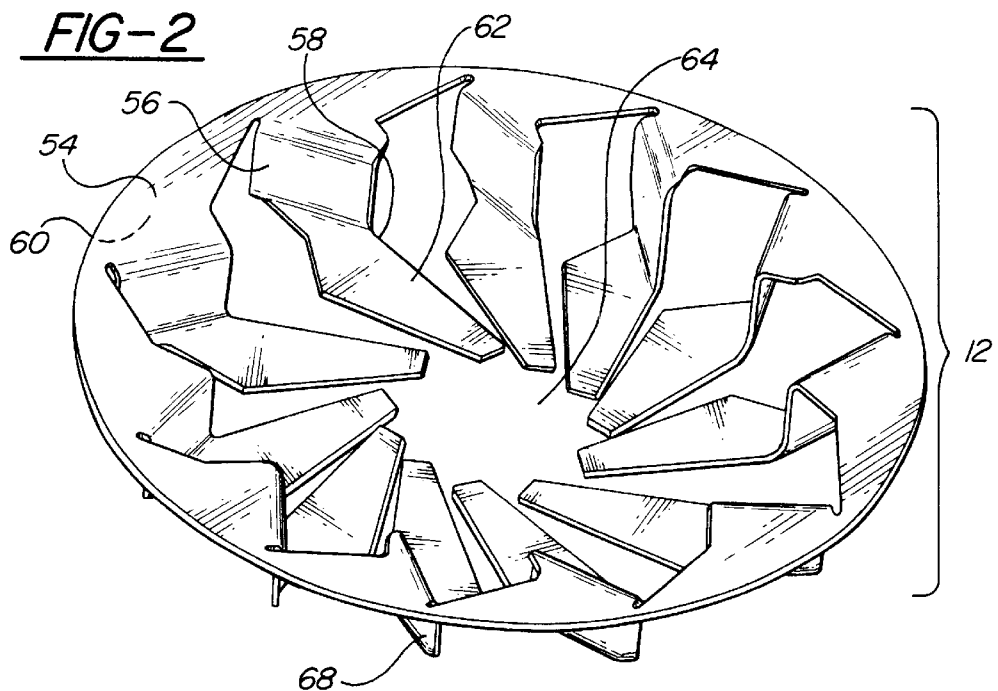
FIG. 2 is a perspective view of the fan according to the present invention.

In the following FIGURES the same reference numerals are used to identify the same components in the various views. The present invention is described with respect to an alternator or a generator. However, those skilled in the art will recognize that the present invention is equally applicable to other rotating electrical machines Referring now to FIG. 1, an alternator 10 has a first fan 12 and second fan 14 according to the present invention. Alternator 10 has a first housing portion 16 and a second housing portion 18 that are coupled together using fasteners 20. The first housing portion 16 and the second housing portion 18 support a rotor assembly 22 comprising a shaft 24 and a rotor 26. The rotor 26 is fixedly coupled to the shaft 24, and the shaft 24 is rotatably coupled to the first housing portion 16 and the second housing portion 18. The shaft has a longitudinal axis 28 about which the first fan 12 rotates. As illustrated, rotor 26 is a Lundel type rotor. Rotor 26 has a first pole 30 and a second pole 32. In order to cool the alternator 10 during operation, a first fan 12 is fixedly coupled to the first pole 30, and a second fan 14 is fixedly coupled to the second pole 32. Shaft 24 supports a pair of parallel spaced apart slip rings 34. The slip rings 34 are electrically coupled to a coil (not shown) within rotor 26. Slip rings 34 provide an electrical connection to a power source. A bearing 36 is coupled to the rotor assembly 22 in each housing portion. A pulley 38 is coupled to shaft 24 by a nut 40. Pulley 38 couples to an engine or accessory drive belt of the engine so that as the engine crankshaft rotates the drive accessory belt, the rotor 26 is rotated and causes the rotor 26 to generate AC electrical within the stator 42.

First housing 14 has a recess 44 opposite stator 42. Recess 44 is used to house a rectifier bridge 46 and brush holder assembly 48. A cover 50 encloses the brush holder assembly 48 and rectifier bridge 46 within recess 44. Brush holder fasteners 52 such as nuts secure brush holder assembly 48 within recess 44.

Figure 3:
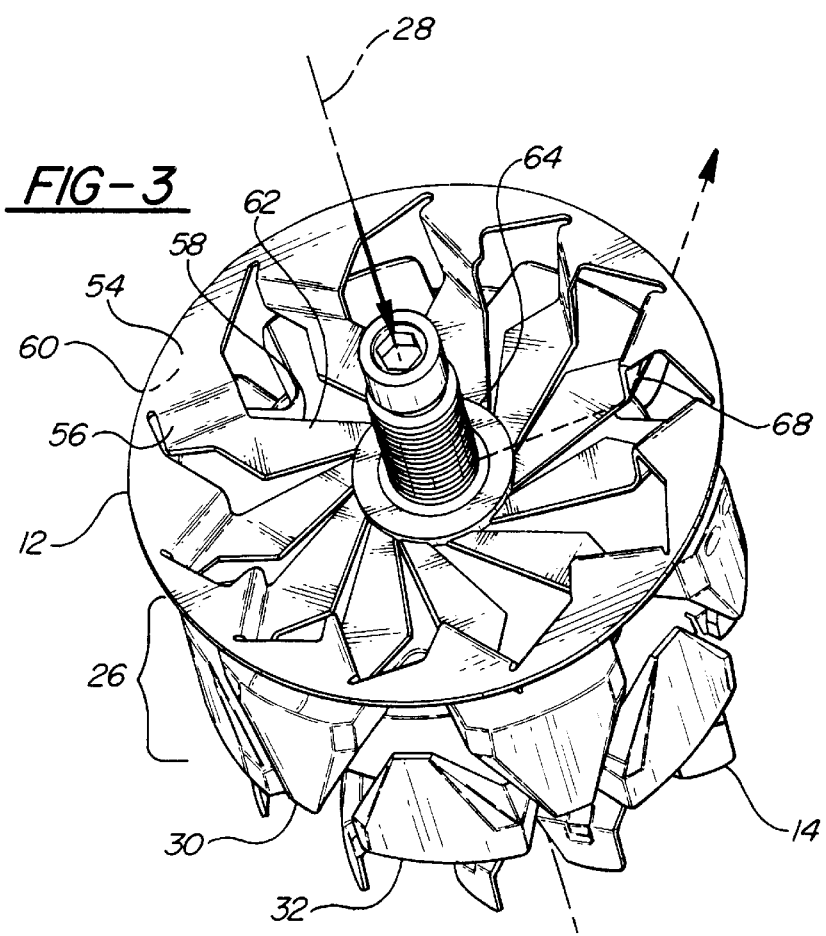
FIG. 3 is a perspective view of the fan coupled to the rotor assembly according to the present invention.

Referring now to FIGS. 2 and 3, the first fan 12 is identical to the second fan 14 in its construction and operation. The fan 12 comprises a continuous ring 54, a plurality of blades 56, and a plurality of tabs 58. The continuous ring 54 is disposed in a top plane of the fan 12 and connects the plurality of blades 56 extending therefrom. The continuous ring 54 has a bottom surface 60 subject to direct the flow of air radially outward from the fan 12. The plurality of blades 56 extends from the continuous ring 54 at a predetermined angle.

Preferably, the predetermined angle is ninety degrees. The plurality of tabs 58 extends from the plurality of blades 56 into a bottom plane that is parallel to the top plane. The plurality of tabs 58 has a top surface 62 across which air may flow from a center area 64 of the fan 12 to the plurality of blades 56. The plurality of tabs 58 is fixedly coupled to a pole of the rotor 26. Preferably, this association between the plurality of tabs 58 and the pole of the rotor 26 is accomplished by a laser weld; Since the plurality of blades 56 is supported by the continuous ring 54 and the plurality of tabs 58, the alternator 10 can operate at high rotational speeds without the risk of fatigue fracture of the plurality of blades 56.

In operation, the fan 12 rotates and draws air in a first direction parallel to the longitudinal axis 28 of the shaft 24. The air flows from a space above the top surface 62 of the tabs 58 into the center area 64 of the fan 12. More specifically, air flows from an external space of the alternator through vent openings 66 of the housing 16, 18 into the center area 64 of the fan 12.

Once inside the housing, the air cools the alternator 10. Then, the heated air is drawn in a second direction radially outward relative to the fan 12. The heated air typically flows from the center area 64 of the fan 12 across the top surface 62 of the tabs 58 to the blades 56.

Once the heated air reaches the blades 56, the blades 56 may direct the heated air to flow along two general paths. On a first path, the blades 56 direct the heated air in a third direction radially outward relative to the fan 12. The heated air flows across an outer surface 68 of the blades 56 in a substantially radial direction with respect to the fan 12 and exits the alternator through vent openings 66 in the housing 16, 18. Alternatively, on a second path, the blades 56 direct the heated air in a third direction parallel to the longitudinal axis 28 of the shaft 24. The heated air flows across the outer surface 68 of the blades 56 away from the top surface 62 of the tabs 58 and towards the bottom surface 60 of the continuous ring 54. Then the heated air flows in a fourth direction radially outward relative to the fan 12. The heated air flows across the bottom surface 60 of the continuous ring 54 in a substantially radial direction with respect to the fan 12 and exits the alternator 10 through vent openings 66 in the housing 16, 18. Thus, the continuous ring 54 reduces the amount of heated air recirculated within the alternator 10 and subsequently improves the cooling and performance of the alternator 10.

While particular embodiments of the invention have been shown and described, numerous variations alternate embodiments will occur to those skilled in the art. Accordingly, it is intended that the invention be limited only in terms of the appended claims.

What is claimed is:

1. A fan for a rotating electrical machine comprising:
   a continuous ring disposed in a top plane;
   a plurality of planar blades extending from said continuous ring, said continuous ring connecting said plurality of planar blades; and
   a plurality of tabs extending from said plurality of planar blades and disposed in a bottom plane.

2. The fan of claim 1 wherein said plurality of tabs is fixedly coupled to a rotor.

3. The fan of claim 1 wherein said plurality of tabs is laser welded to a rotor.

4. The fan of claim 1 wherein said plurality of planar blades is disposed at a predetermined angle relative to a radial line of a rotor.

5. The fan of claim 1 wherein said plurality of planar blades extends perpendicularly from said plurality of tabs.

6. The fan of claim 1 wherein said continuous ring extends perpendicularly from said plurality of tabs.

7. The fan of claim 1 wherein said rotating electrical device comprises an alternator.

* * * * *